United States Patent [19]
Fleischer

[11] 3,880,402
[45] Apr. 29, 1975

[54] MULTIPLE PLATE VALVE

[76] Inventor: Henry Fleischer, 18 Notch Park Rd., Little Falls, N.J. 07424

[22] Filed: July 26, 1973

[21] Appl. No.: 382,961

[52] U.S. Cl. .................... 251/212; 74/413; 251/248
[51] Int. Cl. ............................................ F16k 3/00
[58] Field of Search. 251/206, 212, 304, 248–250.5; 137/552.5, 614.16, 614.17, 630.21, 636; 74/413

[56] References Cited
UNITED STATES PATENTS

| | | | |
|---|---|---|---|
| 1,247,682 | 11/1917 | Howell | 251/250 X |
| 1,384,233 | 7/1921 | Califf | 137/552.5 |
| 1,951,121 | 3/1934 | Babcock | 251/248 X |
| 1,964,663 | 6/1934 | Gossler | 251/250 |
| 2,387,397 | 10/1945 | Hill | 251/248 X |
| 2,878,829 | 3/1959 | Folmsbee | 251/248 X |
| 3,782,215 | 1/1974 | Moody | 74/413 X |

*Primary Examiner*—Henry T. Klinksiek

[57] ABSTRACT

A multiple plate valve is provided which includes a body portion having an opening therein, at least a pair of closure members, such as plates, operatively disposed within said body portion and adapted to be moved between open and closed positions and to cooperate with each other to close off the opening in the body portion, and means for repositioning the closure members with respect to each other and the opening, as the closure members wear out, so that the closure members will continue to cooperate with each other to close off the opening.

Such a valve is particularly useful where it is employed in a conduit used for delivering abrasives or caustic chemicals which tend to wear out the closure members of the valve.

13 Claims, 17 Drawing Figures

MULTIPLE PLATE VALVE

FIELD OF THE INVENTION

The present invention relates to a multiple plate valve which includes at least two closure members which cooperate with each other in opening and closing the valve. Such a valve is particularly adapted to handle flow of abrasive materials.

BACKGROUND OF THE INVENTION

Conventional valves employed in conjunction with equipment for delivering a flow of abrasive materials, such as sand blasting equipment, normally have a relatively short working life. Such valves generally comprise a valve body which includes an opening therein, and a plate member housed in said body and which includes an opening therein. The plate member can be manipulated from outside of the valve body to open the valve in which case the opening in said plate member is moved into alignment over the opening in the valve body so as to allow abrasive material to flow through the valve. The valve is closed to stop flow of abrasives therethrough by merely manipulating the plate member so that the opening therein is moved out of alignment and away from the opening in the valve body so that said openings in no way overlap. As the valve is moved from its open position to its closed position and vice versa, the plate member, specifically, that area surrounding the opening therein, comes into direct contact with abrasive or caustic material. This action causes wear about the opening in the plate member. The amount of wear produced will depend upon the type of abrasive or caustic employed, the rate of flow thereof through the valve and the number of times the valve is opened and closed. Eventually, and usually within a relatively short time, the abrasive etc. will cause sufficient wear of the plate member so that the opening therein will be so large as to make it impossible to close off the valve. At this stage, the valve becomes useless and can only be made operable by replacing the worn out plate member with another plate member. Depending upon the design of the valve, this is at the least, an expensive and frequent maintenance operation since the plate members required wear out quickly and are costly. At the most, it is impossible to replace the worn out plate members and thus, the worn valve would have to be discarded and replaced with a new valve.

BRIEF STATEMENT OF THE INVENTION

In accordance with the present invention, there is provided a multiple plate valve which can be employed in conjunction with equipment designed for delivering abrasive or caustic materials, such as sand-blasting equipment, and which overcomes the maintenance and replacement problems associated with the prior art valve described hereinbefore. Applicant overcomes such problems by replacing the plate member of the prior art valve with at least two closure or plate members which are designed to move between spaced and overlapping positions corresponding to open and closed positions, respectively, and which can be periodically repositioned with respect to each other as each plate wears, so that the plates can continue to cooperate with each other to close off the valve.

The multiple plate valve of the invention includes a body portion, which can take the form of a pair of outer cover members, having an opening therein, at least a pair of closure members, such as plates, operatively disposed within said body portion and adapted to be moved between open and closed positions and to cooperate with each other to close off the opening in the body portion, and means for repositioning the closure members with respect to each other and the opening, as the closure members wear out, so that the closure members will continue to cooperate with each other to close off the opening.

Such a valve may be employed for many uses as will be apparent to one skilled in the art and is particularly useful where it is employed in a conduit used for delivering abrasives etc. which tend to wear out the closure members of the valve.

In one aspect of the multiple plate valve of the invention, the closure members comprise a pair of circular plates or disks, or plates of other shape such as oblong, square, etc., which are spaced apart from each other and are eccentrically and pivotally mounted on the body portion for movement into and out of overlapping relationship with each other for closing off the opening in the body portion or alternately allowing flow of material through the opening of the body portion. The valve also includes means for repositioning the plates with respect to each other as the plates wear out. Such means for repositioning the plates will provide increasing pivotal movement of each plates toward each other to provide greater overlapping of each plate with the other so that the plates can continue to cooperate with each other to close off the opening in the body portion as the plates continue to wear or if the plates wear unevenly.

In another aspect of the multiple plate valve of the present invention, the closure members can comprise a pair of plates each of which includes a plurality of teeth, and ratchet or other gear means for engaging corresponding teeth on said plates, said gear means being adapted to cause movement of said plates into open and closed positions over the opening in the body portion. As the plates wear out, the gear means can be used to cause movement of said plates in a manner such that unworn sections of the plates can continue to cooperate with each other to close off the opening in the body portion.

A preferred embodiment of the invention comprises the use of closure members in the form of a pair of circular plates pivotally mounted in concentric relation to each other. Each plate includes at least one opening which openings will line up with each other when the plates are moved to place the valve in its open position. Each plate includes a plurality of teeth, preferably mounted near the periphery thereof, the teeth of each plate facing each other and being adapted to engage ratchet gear or other gear means. The gear means can be manipulated to cause movement of one plate with respect to the other plate so as to move the plate into a position where the openings therein are in or out of alignment with each other. As the two plates begin to wear, they can be manipulated by means of the gear means so that the openings therein can be moved to non-aligning positions where unworn portions of each plate overlap by merely revolving one plate with respect to the other.

In still another embodiment of the multiple plate valve of the invention, the closure members can take the form of a pair of oppositely disposed metal spirals, the bodies of which are adapted to cooperate with each other to open or close the valve. The metal spirals include a plurality of gear teeth which are adapted to engage common gear means, such as a ratchet gear. By means of such gear means, the metal spirals can be made to move up and back past each other depending upon whether the valve is to be opened or closed. As the portion of the bodies of the spirals disposed about the opening in the body portion of the valve begin to wear, the gear means can be manipulated so as to move the spirals past each other so that unworn areas of the spirals can be made to cooperate with each other to overlap to close off the valve opening.

Still another embodiment of the multiple plate valve of the invention comprises a valve as defined hereinbefore wherein the closure members comprise a pair of plates each of which includes gear teeth about the periphery thereof which are adapted to engage common gear means. The gear means impart movement of each plate with respect to the other so that the plates may mutually cooperate to open and close off the opening in the valve body. Each of the plates for use herein is designed so that it has two working areas namely a lower elongated working area and an upper elongated working area. Furthermore, the body portion comprises a pair of cover members which include ridges or grooves therein for holding or guiding the plates for purposes as will be explained below. After one of the working areas of each plate has worn, the plates with aid of the gear means and ridges in the cover members holding the plates can be made ro revolve about each other so that the other unworn working areas thereof will, with the aid of such gear means, be able to move past each other and cooperate to open and close off the opening in the valve.

Any conventional means may be employed to reposition the closure members from outside of the valve, regardless of whether gear means are employed to move the closure members. Where gear means are employed, any conventional means, such as a shaft member connected to the gear means and extending outside the valve, may be employed to cause movement of the gear means and resultant movement of the closure members.

It will be apparent to those skilled in the art that the multiple plate valve of the invention may include more than two closure members, and may in fact include three, four or more closure members which can cooperate with each other to close off one, or even two or more openings in the body portion of the valve.

It will be understood that in each of the aforedescribed embodiments of the multiple plate valve of the invention, the closure members are housed in and may be supported by a pair of cover plates as will be seen hereinafter and in many of such embodiments, the one or both covers function as the valve body.

BRIEF DESCRIPTION OF THE FIGURES

FIG. 9 a is a view of another embodiment of the multiple plate valve in accordance with the invention wherein one cover has been removed;

FIG. 10 is a view of the embodiment shown in FIG. 9a wherein upper working areas of the plates therein have been worn; and FIG. 11 is a side view of the multiple plate valve shown in FIG. 9a.

DETAILED DESCRIPTION OF THE FIGURES

Figure 1:
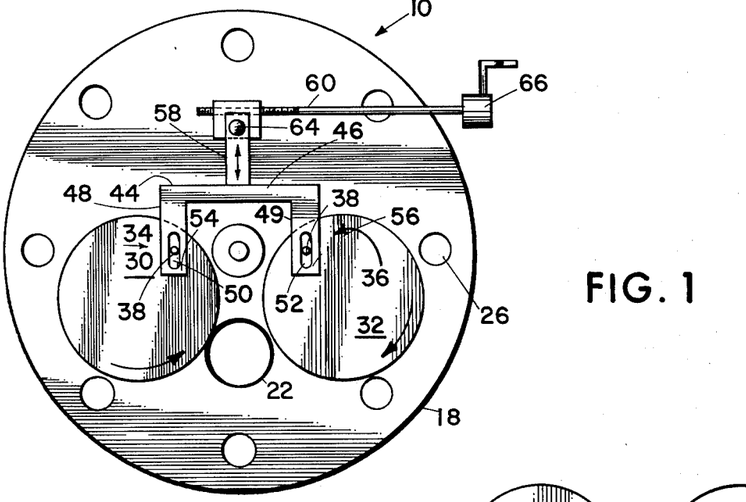
FIG. 1 is a view of a multiple plate valve in accordance with the invention which includes a pair of closure members in the form of circular disks, and wherein one cover thereof has been removed.
Figures 1A, 2:
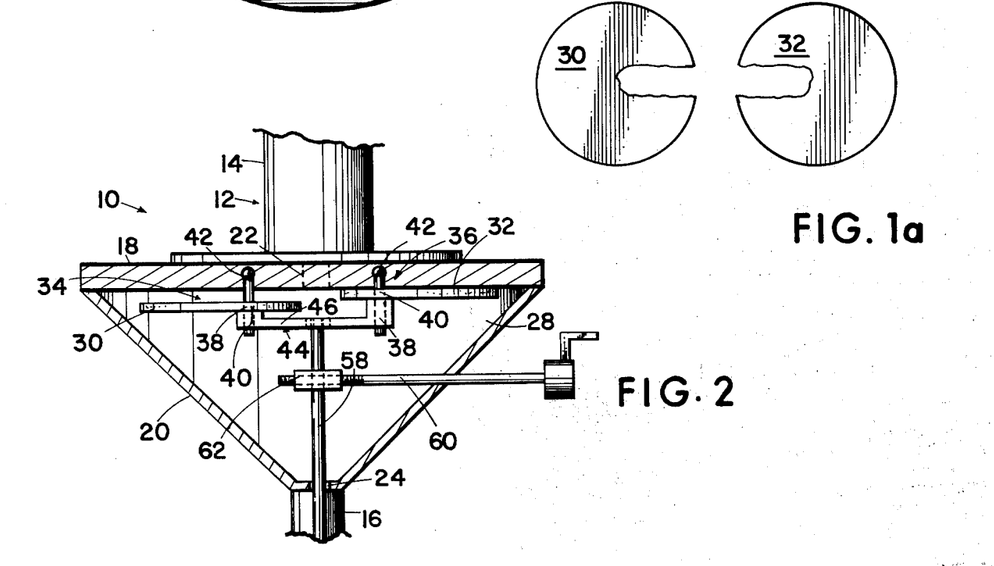
FIG. 1a is a view of the closure members of FIG. 1 in a partially worn condition.
FIG. 2 is a side view of the valve shown in FIG. 1.

Referring to the accompanying drawings wherein like numerals refer to the like parts in the several views, FIGS. 1, 1a and 2 illustrate one of the embodiments of the multiple plate valve of the inventions indicated generally by the numeral 10.

The valve 10 is mounted in a conduit generally referred to by the numeral 12 which includes conduit portions 14 and 16, as shown in FIG. 2. The conduit portion 14 may be connected to a sand or other abrasive supply tank which may also include water or other liquid, and conduit portion 16 may be connected to an abrasive delivery nozzle or hose. The valve 10 includes cover plates 18 and 20, only cover plate 18 being shown in FIG. 1. Cover plate 18 includes an opening or hole 22 which is in alignment with the interior of conduit 14; cover plate 20 includes an opening generally shown by the numeral 24 (in FIG. 2) which is in alignment with opening 22 in cover plate 18. In this embodiment, the valve body is actually defined by the cover plates 18 and 20 and the area between these cover plates. Cover plates 18 and 20 are secured to each other by any conventional means, such as by a plurality of nuts and bolts which are adapted to engage the openings 26 in cover plate 18 with similar openings in cover plate 20, said openings in cover plate 20 not being shown for purposes of clarity.

Disposed within the internal chamber 28 (shown in FIG. 2) defined by the area formed between the cover plates 18 and 20, are closure members 30 and 32. Closure members 30 and 32 as illustrated take the form of a pair of circular disks or plates which are eccentrically and pivotally mounted on cover plate 18 by means of pivot mounting means generally referred to by the numerals 34 and 36, respectively. Pivot mounting means 34 and 36 generally comprise a shaft 38 which passes through off-centered bore 40 in disks 30 and 32. One end of the shaft 38 terminates in a ball shape which is adapted to engage ball sockets 42 in cover plate 18, as shown.

Figure 3:
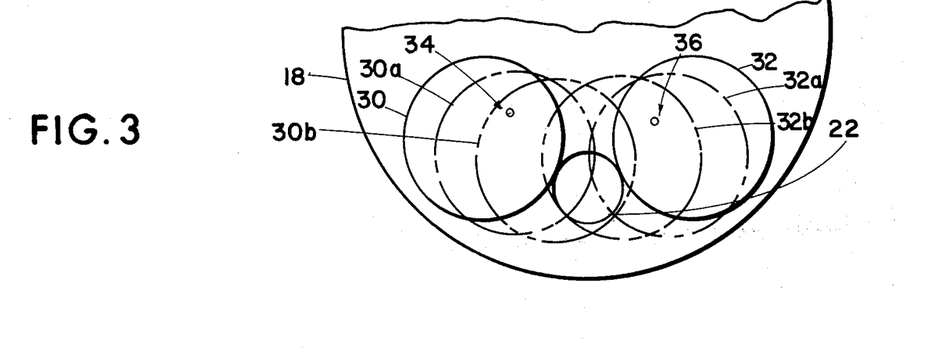
FIG. 3 is a fragmentary view of a portion of the multiple plate valve shown in FIG. 1 illustrating various positions of the plates or closure members thereof.

Disks 30 and 32 are adapted to be pivotally moved about shaft 38 from the position shown in FIGS. 1 and 2 (which is the open position) into overlapping relationship with each other so as to close off the opening 22 in the cover plate 18. In addition, disks 30 and 32 are adapted to be moved from such overlapping position (the closed position) away from each other so as to clear the opening 22 and allow material flowing through conduit portion 14 to flow through the cover plate 18 via opening 22 into the internal chamber 28 and through the opening 24 in cover plate 20 and finally into conduit portion 16. This can be accomplished by applying a downward force to each of the disks 30 and 32 so that said disks 30 and 32 pivot on shafts 38, which causes rotation of disk 32 in a counter-clockwise direction and rotation of disk 30 in a clockwise direction so that the disks 30 and 32 move out of overlapping relationship with each other away from the opening 22 in cover plate 18 and thereby clear the opening 22. The disks 30 and 32 can then be made to move into overlapping relationship with each other and over the opening 22 by applying an upward force to the disks 30 and 32 about the pivot means 34 and 36, which causes clockwise rotation of disk 30 and counter-clockwise rotation of disk 32 about the shafts 38. Such movement is shown in FIG. 3. As shown in FIG. 3, the position of disks 30 and 32 represented by the solid lines is the open position allowing flow of material through the opening 22 and cover plate 18. As an upward force is applied to disks 30 and 32 thereby causing said disks to pivot about pivot means 34 and 36, respectively, the disks 30 and 32 move from their open position to the position indicated by the phantom lines 30a and 32a, which is a partially closed position, to their overlapping and closed position as represented by the phantom lines 30b and 32b. The disks 30 and 32 may then be moved from their closed and overlapping position back to their open position by applying a downward force to said disks along or about the pivot means 34 and 36, respectively, so that the disks move from their closed position to the partially closed position as represented by the phantom lines 30a and 32a and back to their open position as indicated by the solid lines 30 and 32, respectively.

The means employed for effecting the movement of the disks 30 and 32 are shown in FIGS. 1 and 2 and include U-shaped member 44 which includes horizontal leg 46 and vertical legs 48 and 49 which include slots 50 and 52, respectively, which are adapted to engage a portion of shafts 38. The upward force necessary to move the disks 30 and 32 into their closed position is provided by merely moving the U-shaped member 44 in an upward direction thereby causing the slots 50 and 52 to ride upwardly so that the end portions 54 and 56, respectively, of vertical legs 48 and 49, engage and contact the shafts 38 causing such shafts to move upwardly in the ball sockets 42, which in turn, cause movement of the disks 30 and 32 in counter-clockwise and clockwise directions, respectively. Such an upward force can be applied to the U-shaped member 44 through elongated member 58, which is connected to the U-shaped member 44, as shown. Likewise, a downward force can be applied against the U-shaped member 44 by means of the elongated member 58.

The means for applying such forces to the elongated member 58 can comprise any conventional means such as elongated member 60 which may be connected via collar 62 to shaft 58 as shown in FIGS. 1 and 2. The member 60 terminates in a handle portion 66, which is disposed externally of the cover plate 18 and in fact externally of the entire valve 10, for easy manipulation.

An upward force is applied to the elongated member 58, by merely lifting member 60, in order to move the disks 30 and 32 into their closed position over the opening 22 in cover plate 18. It will be apparent to one skilled in the art that the disks 30 and 32 can be moved into their open position by merely applying a downward force to the member 60.

As the plates or disks 30 and 32 are moved from their closed position to their open position, and vice versa, the disks begin to wear as shown in FIG. 1a. In such case, the means for repositioning the disks 30 and 32 with respect to each other and the opening 22 in the cover plate 18, so that the disks will continue to cooperate with each other to close off the opening, are provided in the same means for applying the upward and downward forces to the disks 30 and 32, namely, the U-shaped member 44 and the member 60 and related components as described hereinbefore. Thus, where the plates 30 and 32 begin to wear, the disks 30 and 32 can be moved into their closed position by merely applying a larger upward force, larger than that originally applied to move the disks into their closed position when such disks are in an unworn condition.

It will be understood that as the disks are used as closure members for closing off the opening 22 and cover plate 18, wear of the disks will continue until the disks are essentially worn from one periphery thereof across the disks to almost another periphery thereof. At this stage, the disk will be completely worn for purposes of the valve of the invention and will have to be replaced.

It will also be understood that the circular disks 30 and 32 can be replaced by other shaped disks such as oblong disks or even rectangular or square disks, as will be apparent to one skilled in the art. Furthermore, it will be appreciated that the closure members or disks 30 and 32 can be employed to open and close the opening 24 in the cover plate 20 instead of as shown in FIGS. 1 to 3.

Figure 4:
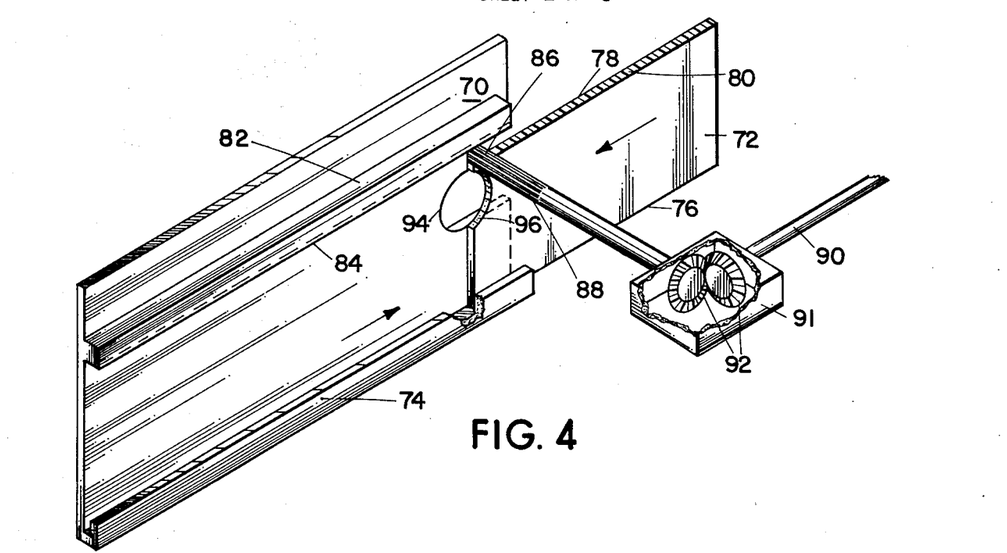
FIG. 4 is a perspective view of a pair of closure members suitable for use in the multiple plate valve of the invention.

Referring now to FIG. 4, there is shown another embodiment of closure members which may be employed in conjunction with the multiple plate valve of the present invention. As shown, such closure members comprise a pair of plates 70 and 72 which are adapted to be held between the cover plates 18 and 20 in a manner such that the plates 70 and 72 can be moved into overlapping relationship with each other over the opening 22 in the cover plate 18 so as to close off said opening 22. In the embodiment shown in FIG. 4, the plate 70 is designed with a guide rail 74 in which the lower edge 76 of plate 72 is engaged and rides along. The upper edge 78 of plate 72 is fashioned with gear teeth 80, as shown, and elongated flange member 82 connected to plate 70 is fashioned with gear teeth at the lower edge 84 thereof. The gear teeth of plates 70 and 72 are adapted to engage gear 86, as shown, so that the plates 70 and 72 can be made to move along the gear 86 toward or away from each other depending upon the direction of rotation of the gear 86.

Thus, where it is required to open the valve 10, the gear 86 can be rotated in a first desired direction thereby causing the plates 70 and 72 to ride along the gear 86 and move in opposite directions from each other so as to open the valve. However, where it is desired to close the valve, the gear 86 can be made to rotate in the opposite direction thereby causing movement of the plates 70 and 72 towards each other until they overlap and close off the opening 22 in the cover plate 18 and thereby close the valve 10.

Rotation of the gear 86 can be effected by means of shaft 88 which is connected to gear 86. Rotation of the shaft 88 can be effected from outside of the valve 10 by means of rod 90 which is connected to the shaft 88 by means of intermeshing with gear means 92 disposed in holding plate 91. Rotation of rod 90 causes movement of the gear means disposed in holding plate 91, which in turn causes rotation of shaft 88.

Figure 4A:
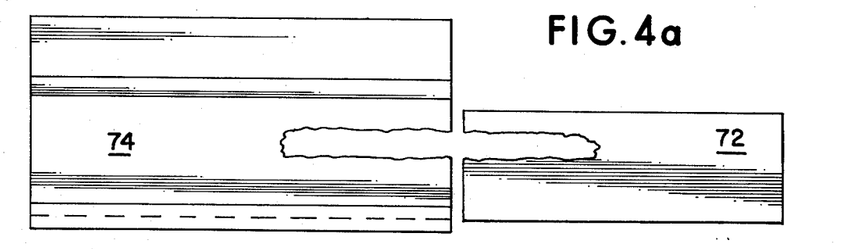
FIG. 4a is a view of the closure members of FIG. 4 in a partially worn condition.

As the plates 70 and 72 begin to wear as shown in FIG. 4a, the plates 70 and 72 may be moved into greater overlapping relation with each other, so that the unworn portions of these plates can be employed in conjunction with each other to overlap and close off the opening 22.

It will be appreciated that inasmuch as the plate 72 is adapted to ride in the guide member 74 of the plate 70, that the plates 70 and 72 can never completely be separated from each other, as in the case of the disks 30 and 32 shown in the embodiment illustrated in FIGS. 1 through 3. Accordingly, the plates 70 and 72 are initially fashioned with semicircular cut-outs 94 and 96, respectively, which cut-outs, in conjunction with each other, form a circular opening corresponding to the opening 22 in cover plate 18. Thus, when it is desired to initially move the plates 70 and 72 into their open position so as to allow flow of material through the opening 22 in cover plate 18, the plates 70 and 72 will be moved into a position whereby the semi-circular cut-outs 94 and 96, respectively, will be aligned with each other to form a circular opening corresponding to the opening 22. However, where it is desired to close the valve 10 and the opening 22, the plates 70 and 72, by means of the gear 86, shaft 88 and rod 90 can be moved into overlapping relationship with each other so that no part of the semi-circular cut-outs 94 and 96 are in contact with each other.

Figure 5:
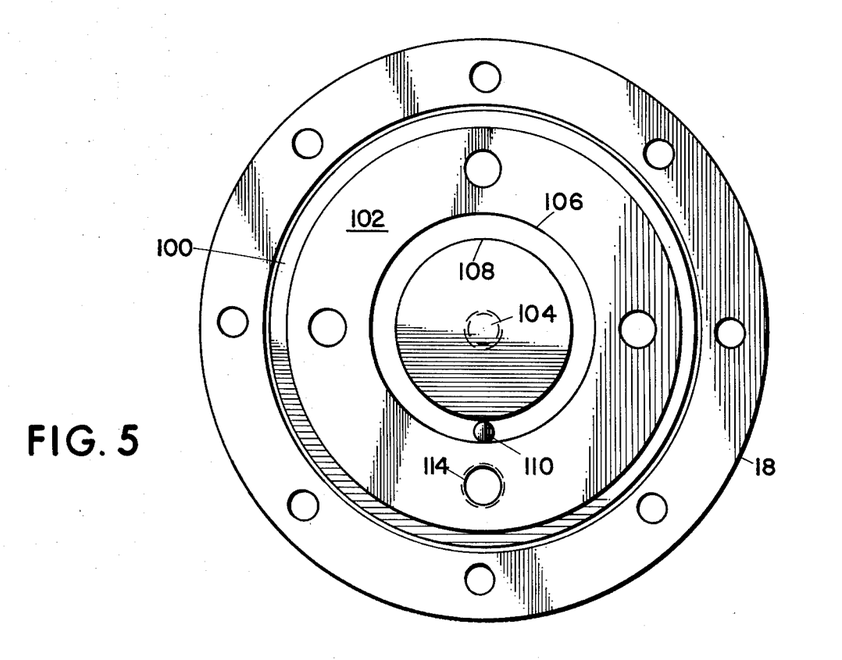
FIG. 5 is a plan view of another embodiment of the multiple plate valve of the invention wherein the closure members comprise a pair of concentrically disposed circular plates.

Referring now to FIG. 5, there is illustrated another embodiment of the multiple plate valve in accordance with the present invention. As shown, the closure members are in the form of a pair of circular disks 100 and 102 which are pivotally mounted on cover plate 18 so that the circular disks 100 and 102 can be made to revolve, one within the other, and can be employed in conjunction with each other to open or close the opening 22 in the cover plate 18. The larger plate 100 is pivotally mounted to the cover plate 18 by conventional pivot means 104 as shown. The smaller circular plate 102 is disposed concentrically with respect to plate 100.

Figure 5A:
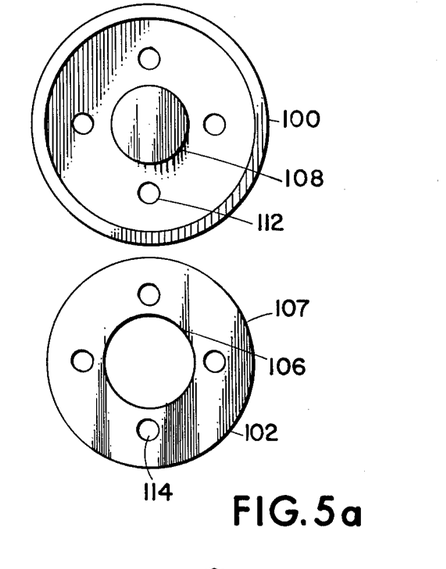
FIG. 5a is a view of the closure members of FIG. 5.
Figure 7:
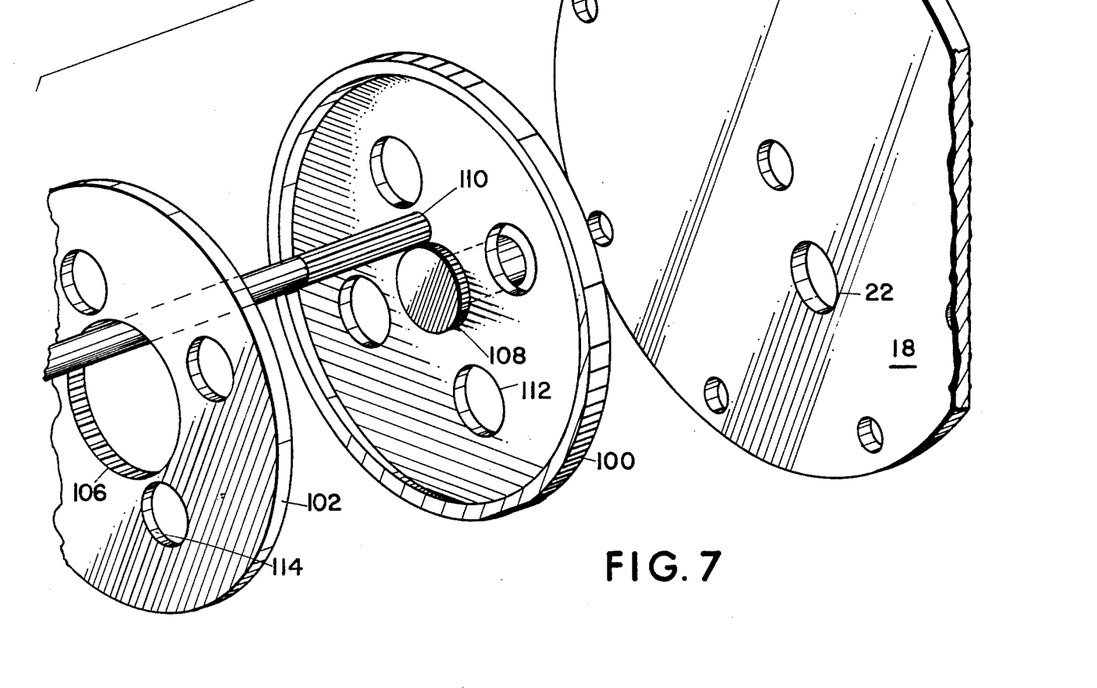
FIG. 7 is an exploded view of the multiple plate valve shown in FIG. 5.

FIG. 5a illustrates the plates 100 and 102 in initial unworn condition. As can be seen, the plates 100 and 102 include circular cut-outs 112 and 114, respectively, which cooperate with each other to form a circular opening corresponding to the opening 22 in the cover plate 18. The plate 102 takes the form of an annulus having an inner periphery 106 and an outer periphery 107 and includes a plurality of gear teeth along the inner periphery 106. The plate 100 includes a plurality of gear teeth disposed along an inner periphery of circular flange 108. The gear teeth of plates 100 and 102 are adapted to engage gear 110, as shown. This is more clearly shown in FIG. 7 which represents an exploded view of cover plate 18 which includes opening 22, circular disk 100 which includes outer periphery of flange 108 having a plurality of gear teeth disposed thereabout and circular opening 112. Also shown in the annulus shaped circular plate 102 which includes circular opening 114 and inner periphery 106 which is fashioned with gear teeth as shown.

Figures 5B, 6:
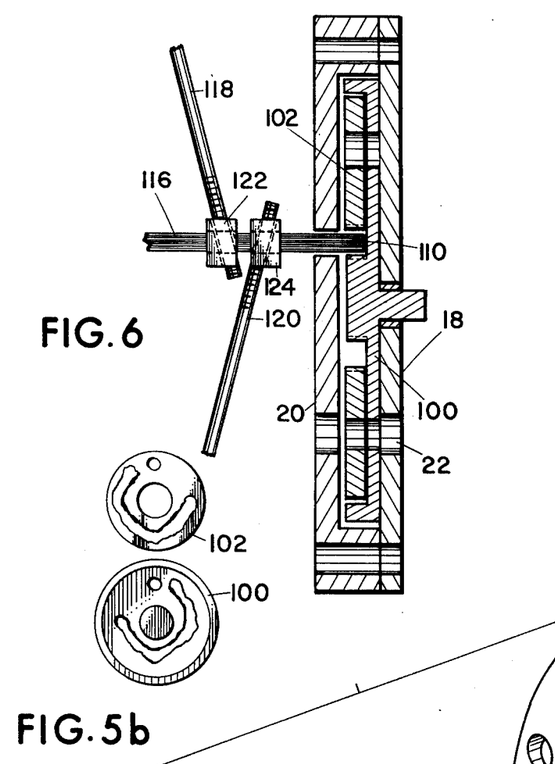
FIG. 5b is a view of the closure members shown in FIG. 5 in a partially worn condition.
FIG. 6 is a side view of the multiple plate valve shown in FIG. 5.

As will be apparent, the plates 102 and 100 are adapted to be held between cover plates 18 and 20, cover plate 20 being shown in FIG. 6. In their assembled condition, the plate 102 is disposed concentrically with respect to the plate 100 in such a manner that the disks 102 and 100 can be moved by means of gear means 110 and rotated with respect to each other so that circular openings 114 and 112, respectively, can be moved into open or aligning positions to form a circular opening and into non-overlapping non-aligned positions so as to close off the opening 22 in cover plate 18.

Worm gear 116 is linked to the gear means 110 to allow movement of such gear means to cause rotation of the circular disks 100 and 102. Connecting rods 118 and 120 are attached to worm gear 116 by means of collars 122 and 124, respectively. The correcting rods 118 and 120 extend outside of the valve and provide convenient means for stabilizing worm gear 116 and prevent undesired movement thereof. The plates 100 and 102 can be made to rotate about each other by rotating the worm gear 116 and thereby cause movement of gear means 110.

The gear means 110 linked to the disks 102 and 100, as described above, may take the form of a conventional gear. Thus, the gear can be controlled by merely moving the worm gear 116 in a back and forth motion to move the gear and thereby move one circular disk with respect to the other circular disk. As the circular disks 100 and 102 begin to wear as shown in FIG. 5a the disks can be moved with respect to each other by means so that they can continue to be moved into overlapping relation so as to close off the opening 22 in the cover plate 18. Furthermore, as shown in FIG. 5a, the circular disks or plates 100 and 102 can be fashioned with a series of circular cut-outs which are adapted to cooperate with each other to cause opening or closing of a corresponding number of openings in the cover plate 18.

The wear pattern on the circular disks 100 and 102 will take the form of a substantially inner circular pattern as shown in FIG. 5b. However, in accordance with the present invention, the positions of the circular disks 100 and 102 can be changed with respect to each other so that unworn portions of the circular disks 100 and 102 can be continually moved into position with respect to each other so that such unworn portions can cooperate with each other to overlap and close off the opening 22 in the cover plate 18.

It will be appreciated that as the worn portion of the circular disks continue around the circumference of the disks, a wear point will be reached so that the disks will have to be replaced with fresh unworn disks.

Figure 8:
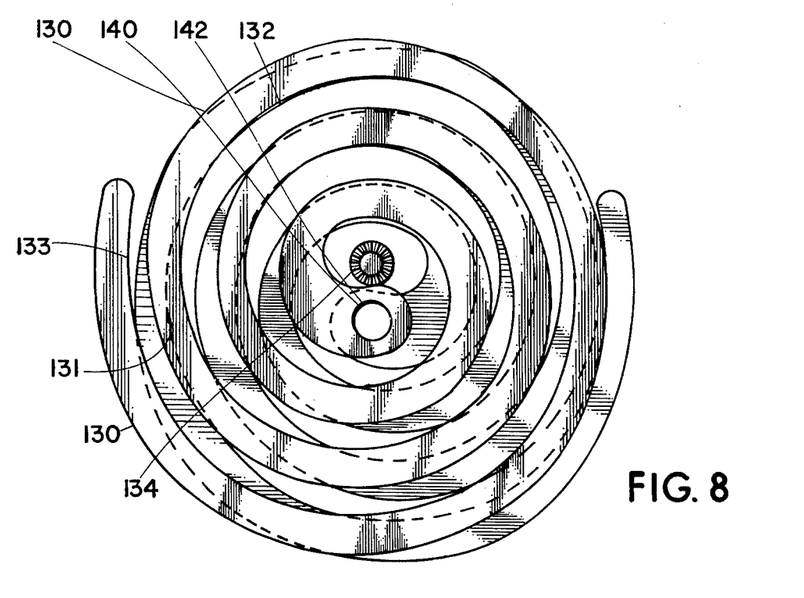
FIG. 8 is a view of a pair of closure members in the form of metal spirals and cooperating gear means suitable for use in the multiple plate valve of the invention.

Referring now to FIG. 8, there is shown another embodiment of the multiple plate valve in accordance with the present invention wherein the closure members comprise a pair of metal spirals 130 and 132, respectively. The spirals 130 and 132 are retained between and supported by the cover plates 18' and 20'. The spirals are positioned so that they are opposite of each other laying one in back of the other and move in equal and opposite directions as will be described hereinafter. The spirals 130 and 132 include a plurality of gear teeth 131 and 133, respectively, which are adapted to engage common gear means 134 and are connected to each other by means of such gear means 134.

As shown, at least one portion of each of the spirals overlap each other so that they can cooperate with each other to close off the opening 22 in the cover plate 18.

The spirals 130 and 132 are held against each other by pressure of the cover plates 18' and 20'. The cover plates 18' and 20' in this embodiment are fashioned with ridges or grooves which aid in guiding movement of the spirals 130 and 132 in equal and opposite directions with respect to each other.

Figure 8A:
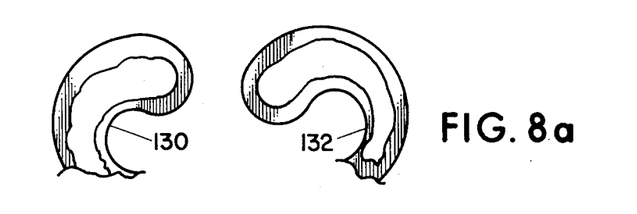
FIG. 8a is a view of the metal spirals shown in FIG. 8 in a partially worn condition.
Figure 8B:
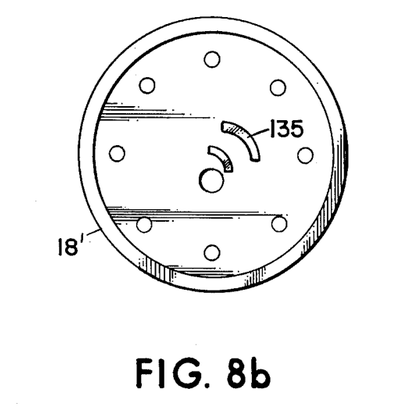
FIG. 8b is a view of one of the cover members for use in the valve of FIG. 8.

The ridges (135) in cover plate 18' are shown in FIG. 8a. As indicated, ridges 135 are employed to guide one of the spirals, for example, spiral 130, as it moves according to the movement of the gear means 134. Corresponding ridges are also present in the cover plate 20' for guiding movement of the other spiral.

Figure 9:
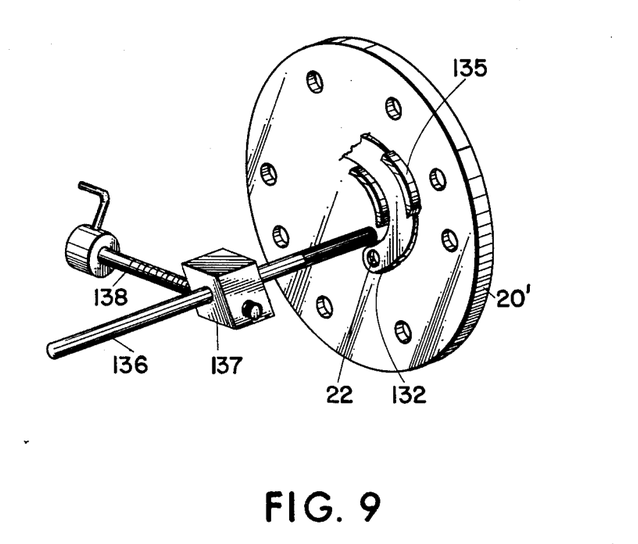
FIG. 9 is a view of the ratchet means and control means therefor employed to manipulate the spirals shown in FIG. 8.

Movement of the spirals 130 and 132 is effected by movement of the gear means 134, which is linked to worm gear 136 and connecting rod 138 as shown in FIG. 9.

Initially, the spirals are designed so that the opening 22 in cover plate 18' is positioned beneath the overlapping ends 140 and 142 of spirals 130 and 132, respectively. The ends 140 and 142 of spirals 130 and 132 can be fashioned with circular cut-outs so that when the ends 140 and 142 are appropriately aligned with each other, a circle is formed of essentially the same dimensions as opening 22.

FIG. 8a shows the spirals 130 and 132 in a partially worn condition. As can be seen, the spirals wear in a spiral pattern which follows the contours of the spirals themselves. Thus, as the spirals wear, they can be positioned by movement of the gear means 134. As seen in FIG. 9, the gear means 134 can be manipulated from outside the valve through threaded rod 138 connected to worm gear 136 by collar 137 and through a pair of intermeshing gears, as in FIG. 4. Rotation of threaded rod in turn causes rotation of worm gear 136. In this manner, unworn portions of the spirals 130 and 132 can be made to move into and out of overlapping relationship with each so as to continue to open and close the opening 22 in the cover plate 18'.

The gear 134 is designed to travel substantially the length of the spirals so that it will be possible to employ substantially the whole length of the spirals, as the spirals wear, for opening and closing the valve.

Figures 10, 11:
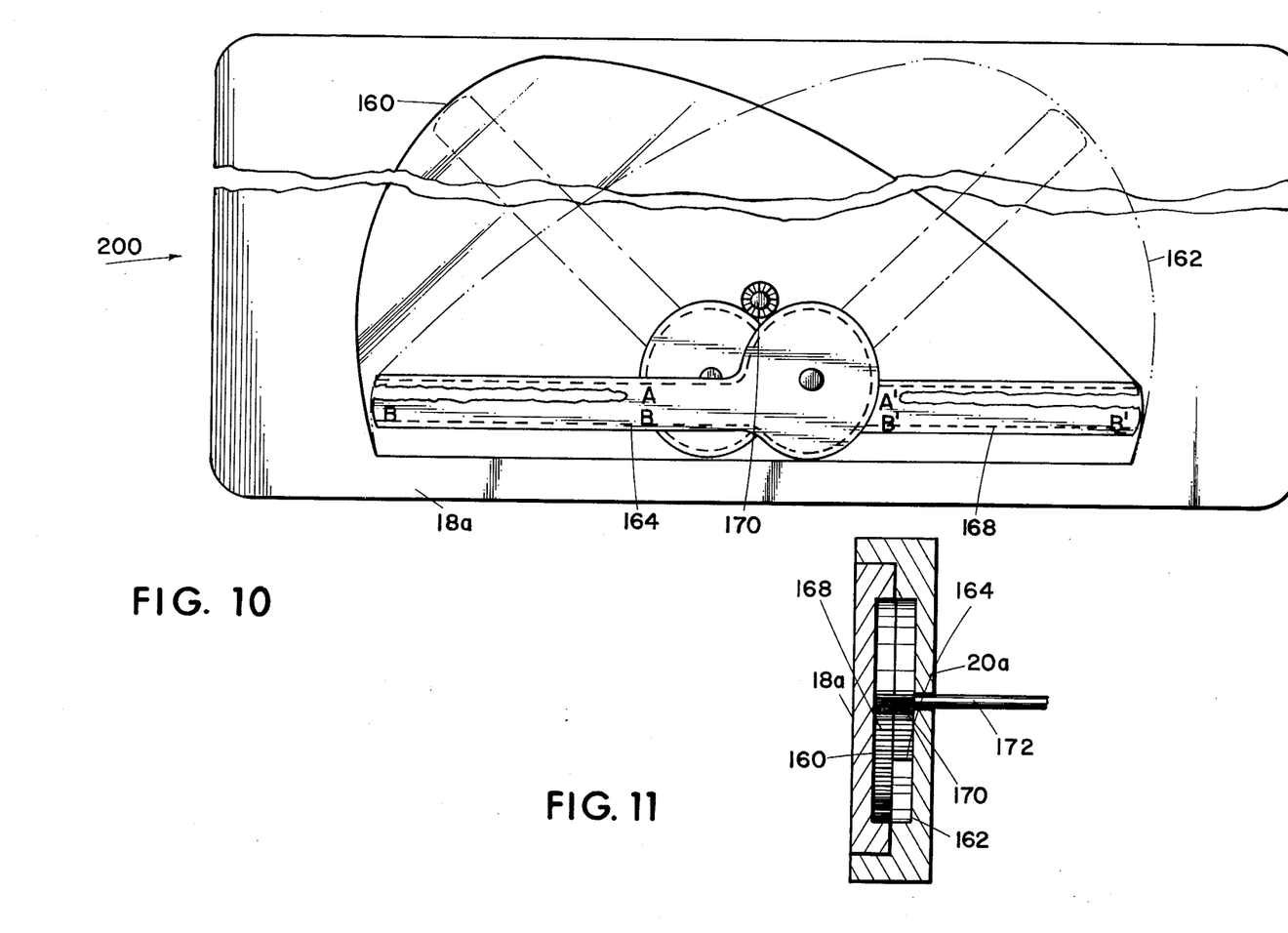

Yet another embodiment of the multiple plate valve of the present invention is shown in FIGS. 10 and 11 wherein the numeral 200 generally designates such valve. As shown, a cover plate 18a includes ridge or guide 160, the purposes of which will become apparent later. The other cover plate 20a (shown in FIG. 11 only) includes ridge or groove indicated by phantom lines 162 in FIG. 10. The closure members employed in the embodiment of FIGS. 10 and 11 comprise plates 164 and 168 which include gear teeth at or near the peripheries thereof. The gear teeth of each of the plates are adapted to engage gear means 170 which allows movement of the closure members with respect to each other to open and close off the opening 22, in a manner as described hereinbefore with respect to FIGS. 4 –9 .

The closure members 164 and 168 are designed so that they can include two elongated working areas, A, B and $A^1$, $B^1$, respectively. Thus, when one working area of each of the closure members 164 and 168 wear out, (for example areas A and $A^1$), the closure members are designed to be moved about each other, as shown by the phantom lines in FIG. 10 and substantially turned around to reverse their positions so that the other working areas of each of the closure members (areas B and $B^1$) can be employed.

As will be apparent, the same gear means 170 is adapted to be employed for movement of the closure members 164 and 168 wherein the first working areas of each of said members are employed and also wherein the second working areas are employed, that is after the first working areas are worn.

The embodiment shown in FIG. 10 illustrates the first working areas (A and $A^1$) of each of the closure members 164 and 168 in a worn condition. At this juncture, the gear means 170 can be manipulated so as to cause movement of the closure members 164 and 168 about the ridges 160 and 162 in cover plates 18a and 20a so that the closure members 164 and 168 can be essentially turned over to present the new unworn working areas thereof to the opening 22 in the cover plate 18a. This can be accomplished from outside of the valve by rotation of worm screw 172 which is connected to gear means 170, in a manner similar to that described with respect to FIG. 5.

In this embodiment, as in all of the embodiments described hereinbefore, the closure members are adapted for long and continued use because they can be repositioned with respect to the valve opening so that the unworn portions of these closure members can be employed in conjunction with each other and be moved into and out of overlapping relationship to close off and open the multiple plate valve of the invention.

What is claimed is:

1. A valve designed to continue to function to close off a conduit even after portions of the valve have worn, said valve comprising, in combination, a body portion including a pair of outer cover members, each of said cover members have an aperture therein;

at least a pair of closure members comprising first and second plates retained between said outer cover members, said first plate including a first aperture and a flange spaced from said first aperture, said flange including a plurality of gear teeth disposed about the same, and a second plate including a second aperture and an opening therein spaced from said second aperture, said opening being larger than said flange of said first plate, and having a plurality of gear teeth disposed in proximity to the periphery of said opening, said second plate being disposed on said first plate so that said flange of said first plate passes through said opening of said second plate;

common gear means for positioning said first and second plates relative to each other and to said apertures of said outer cover plates, said gear means being disposed between said flange of said first plate and said second plate to engage said gear teeth of said first plate and said gear teeth of said second plate in a manner such that movement of said gear means causes simultaneous movement of said first and second plates toward or away from each other so that said first and second plates and apertures in said plates may cooperate with each other to form a common opening in alignment with said apertures in said outer cover plates or to close off said apertures in said outer cover plates; and means for maintaining said gear teeth of said second plate and said gear teeth of said first plate in engagement with said gear means.

2. The valve in accordance with claim 1 wherein said means for maintaining said gear teeth of said first and second plates in engagement with said gear means comprises said pair of outer cover members.

3. The valve in accordance with claim 1 wherein said means for maintaining said gear teeth of said first and second plates in engagement with said gear means comprises means for pivotally connecting said plate to one of said outer cover members.

4. The valve in accordance with claim 3 wherein said first plate includes retaining means for retaining said second plate in alignment with said first plate.

5. The valve in accordance with claim 1 wherein said first and second plates comprise a pair of circular disks disposed concentrically with respect to each other.

6. A valve designed to continue to function to close off a conduit even after portions of the valve have worn, said valve comprising, in combination, a body portion including a pair of outer cover members, each of said cover members having an aperture therein;

at least a pair of closure members comprising first and second spiral members oppositely disposed one behind the other and retained between said outer cover members, each of said spiral members including an aperture therein and adapted to be positioned so that said apertures in each of said spiral members is in alignment with each other and with at least one of the apertures in said outer cover members, each of said spiral members further including a plurality of gear teeth which are adapted to engage gear means;

gear means for positioning said first and second spiral members relative to each other and to said apertures in said outer cover members, said gear means being in engagement with said gear teeth of said first and second spiral members, so that movement of said gear means causes movement of at least one of said first and second spiral members toward or away from each other so that said apertures in said first and second spiral members may be positioned to cooperate with each other to form a common opening in alignment with at least one of said apertures in said outer cover plates or to close off said apertures in said outer cover plates; and means for maintaining said gear teeth of said first and second spiral members in engagement with said gear means.

7. The valve in accordance with claim 6 wherein said means for maintaining said gear teeth of said first and second spiral members in engagement with said gear means comprise a groove and/or ridge in each of said outer cover members which aid in guiding movement of said spiral members in opposite directions with respect to each other.

8. The valve in accordance with claim 6 wherein said aperture in each of said spiral members is initially formed near one end thereof, each of which ends are initially disposed in close proximity to said gear means.

9. A valve designed to continue to function to close off a conduit even after portions of the valve have worn, said valve comprising, in combination, a body portion including a pair of outer cover members each having an aperture therein;

at least first and second elongated rectangular-like closure members adapted to be disposed one behind the other and retained between said outer cover members, each of said closure members including an aperture therein and adapted to be positioned so that said apertures in each of said closure members are in alignment with each other and with at least one of the apertures in said outer cover members, each of said closure members including a plurality of gear teeth extending substantially from end to end of each of said closure members, said gear teeth being adapted to engage gear means so that said first closure member is adapted to be moved from a position wherein a first end thereof is barely in overlapped relation to a second end of said second closure member, across said second closure member, so that said first end of said first closure member is in close proximity to a first end of said second closure member;

gear means for positioning said first and second closure members relative to each other and to said apertures in said outer cover plates, said gear means being in engagement with said gear teeth of said first and second closure members, so that movement of said gear means causes movement of at least one of said first and second closure members toward or away from the other so that said apertures in said closure members may cooperate with each other to form a common opening in alignment with at least one of said apertures in said outer cover plates or said closure members may cooperate with each other to close off at least one of said apertures in said cover plates, and as said first and second closure members wear about the periphery of said apertures therein, at least one of said closure members may be moved by said gear means so that unworn portions of said closure members will overlap and continue to cooperate with each other to close off at least one of said apertures in said outer cover members; and means for maintaining said gear teeth of said closure members in engagement with said gear means.

10. The valve in accordance with claim 9 wherein said means for maintaing said gear teeth of said closure members in engagement with said gear means comprises said outer cover members.

11. The valve in accordance with claim 10 wherein said means for maintaining said gear teeth of said closure member in engagement with said gear means comprises at least one guide groove or ridge disposed on either of said first and second closure members for engaging the other of said second and first closure members.

12. A valve designed to continue to function to close off a conduit even after portions of the valve have worn, said valve comprising, in combination, a body portion including a pair of outer cover members each having an aperture therein;

at least first and second closure members retained between said outer cover members, each of said closure members including an aperture therein and adapted to be positioned so that said apertures in each of said closure members are in alignment with each other and with at least one of the apertures in said outer cover members, each of said closure members including a plurality of gear teeth extending substantially from end to end of each of said closure members, said gear teeth being adapted to engage gear means;

gear means for positioning said first and second closure members relative to each other and to said apertures in said outer cover plates, said gear means being in engagement with said gear teeth of said first and second closure members, so that movement of said gear means causes movement of at least one of said first and second closure members relative to each other so that said apertures in said closure members may cooperate with each other to form a common opening in alignment with at least one of said apertures in said outer cover plates or said closure members may cooperate with each other to close off at least one of said apertures in said cover plates, and as said first and second closure members wear about the periphery of said apertures therein, at least one of said closure members may be moved by said gear means so that unworn portions of said closure members will overlap and continue to cooperate with each other to close off said apertures in said outer cover members; and means for maintaining said gear teeth of said closure members in engagement with said gear means.

13. A method for operating a valve so that the valve may continue to function even after portions of the valve have worn, which comprises the steps of providing a valve adapted to be connected to a conduit or apparatus to control flow of material in such conduit or apparatus, said valve including a body portion having an opening therein, at least a pair of closure members operatively disposed and retained in said body portion, each of said closure members being adapted to be positioned so that said closure members are in or out of alignment with the opening in said body portion and is adapted to move between open and closed positions and close off said opening in said body portion, and means for positioning said closure members with respect to said opening in said body portion to open or close off said opening;

positioning at least one of said closure members so that said closure members are in or out of alignment with the opening in said body portion to open or close off said opening in said body portion; and as said closure members wear, repositioning said closure members with respect to each other, so that unworn portions of said closure members will overlap and cooperate wtih each other to close off said opening in said body portion and thereby close said valve.

* * * * *

UNITED STATES PATENT AND TRADEMARK OFFICE
CERTIFICATE OF CORRECTION

PATENT NO. : 3,880,402
DATED : April 29, 1975
INVENTOR(S) : Henry Fleischer

It is certified that error appears in the above-identified patent and that said Letters Patent are hereby corrected as shown below:

Column 8, line 35, "correcting" should read --connecting--.
Column 8, line 49, after "by" insert --the above--.

Column 11, line 29, after "said", insert --first--.

Signed and Sealed this sixteenth Day of December 1975

[SEAL]

Attest:

RUTH C. MASON
Attesting Officer

C. MARSHALL DANN
Commissioner of Patents and Trademarks